United States Patent
Cruger

[15] 3,662,121
[45] May 9, 1972

[54] PLURAL RECORDER AND INTERSPERSING PLAYBACK

[72] Inventor: James P. Cruger, 41600 Apartado, Mexico, 10 D.F., Mexico

[22] Filed: July 18, 1969

[21] Appl. No.: 842,840

[52] U.S. Cl..............179/100.2 S, 35/35 C, 179/100.2 MD, 274/4 C, 274/4 G
[51] Int. Cl..............................G11b 15/02, G11b 27/30
[58] Field of Search..........179/100.2 S, 100.2 MD, 100.2 B, 179/100.2 E, 100.1 PR, 100.1 PS; 35/35 C, 8 A; 200/50 R, 51 R; 226/46, 47, 48, 110; 274/4

[56] References Cited

UNITED STATES PATENTS

| | | | |
|---|---|---|---|
| 3,234,666 | 2/1966 | Cooper | 35/35 C |
| 3,287,503 | 11/1966 | Kling | 179/100.2 B |
| 3,405,461 | 10/1968 | Joslow | 35/35 C |
| 3,295,853 | 1/1967 | Cheng | 179/100.2 E |
| 3,505,485 | 4/1970 | Andrews | 179/100.2 S |
| 3,323,230 | 6/1967 | Cooper | 35/35 C |
| 3,484,955 | 12/1969 | Lippert | 35/35 C |

Primary Examiner—Bernard Konick
Assistant Examiner—Alfred H. Eddleman
Attorney—Ralph R. Browning

[57] ABSTRACT

Recording means are provided for recording sequentially a series of recordings, such as questions, on a first recording medium, then on playing it back, it will stop at the end of each recording of the series and while so stopped after each recording, a recording to be interposed thereafter on ultimate playback may be made on a second recording medium, thereby providing a second series of sequential recordings such as answers to the questions respectively, on the second medium, then for alternately playing the first series and interposing therebetween on ultimate playback, the respective recordings of the second series, providing a continuous sequential playback of alternate first and second recordings such as a sequential question and answer series playback. A special dual signal recording and stop control is provided whereby a stop of recording and playback may be effected and whereby at the end of each recording of each series a control signal recording is made on the same medium before the stop control is effective. The playback has an automatic control whereby during playback upon encountering one of such recorded control signals, the playback will be interrupted and driving power shifted to the other recording medium. A single instead of a dual recording device may be employed for making the recording on each recording medium, even though the dual device is usually preferable.

6 Claims, 4 Drawing Figures

James P. Cruger
INVENTOR

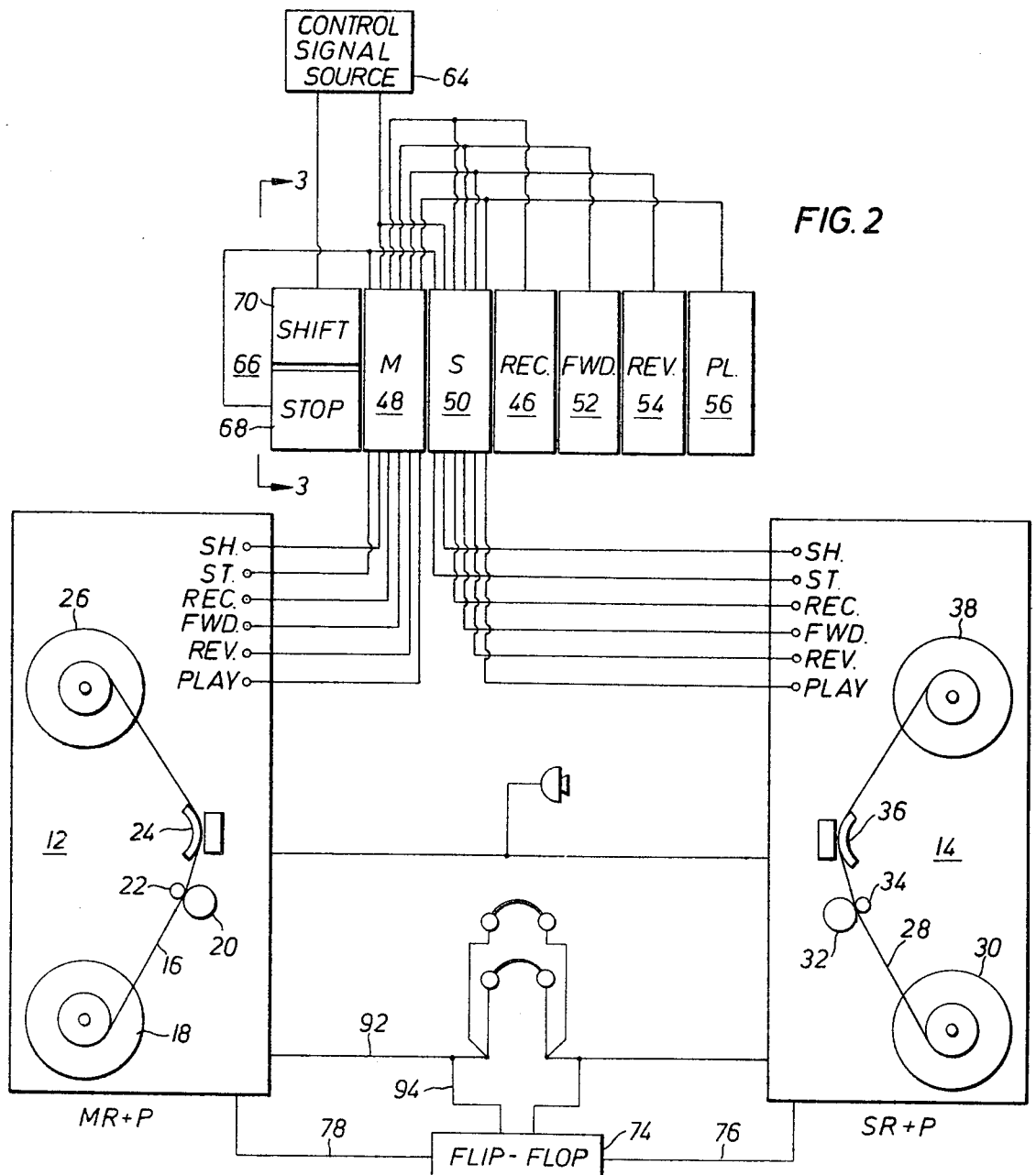
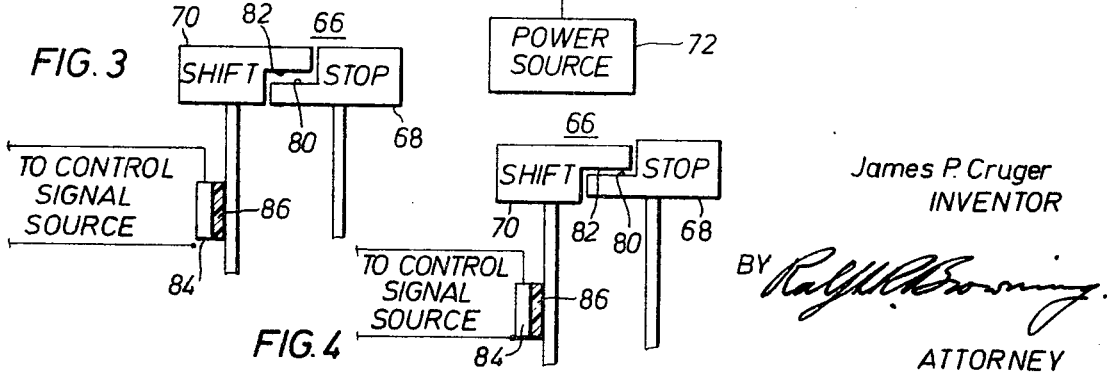

PLURAL RECORDER AND INTERSPERSING PLAYBACK

BACKGROUND OF THE INVENTION

This invention relates to recorders. More particularly, this invention is an educational tool including means for recording a series of some signals such as a series of questions with indications on the recording medium for indicating the end of each question. On playback, the tape containing the questions may be stopped manually or automatically at the end of each question and answers recorded on a second record-playback system. Thereafter, the two tapes containing the questions and the answers can be played back by this new and novel recording system, and the answers to the corresponding questions automatically interspersed after the respective questions.

The invention comprises a recorder having a dual key control means which is not present in other current recorders. The key means is operatively associated with a device for making a record indicating for example when a particular question has terminated and for sequentially operating the indicating device and stopping the recording medium. This novel key means for indicating when specific sonic signals are completed, such as the end of a question, and then stopping the recording medium will be referred to herein as the "shift-stop" key.

Preferably, the shift-stop key is made up of an independently movable stop key for independently stopping the recording medium and a shift key adapted to engage the stop key when the shift key is operated to sequentially place a control indication on the recording medium and then stop the recording medium.

The invention includes a means for detecting the indications on such a running recording medium. Upon detecting indications upon a running recording medium, the detector automatically stops this recording medium and starts the running of the other recording medium. This permits the alternate running of the two recording media, thus for example, permitting a student taking a correspondence course to automatically compare questions submitted to him on one tape with answers he has recorded on the other tape.

The invention as well as its many advantages will become further understood by reference to the following detailed description and drawings, it being, of course, clearly understood that the detailed description sets out a preferred example of the invention and various other forms of the invention will be readily apparent.

FIG. 2 is a schematic view of some of the electrical and mechanical components of the recorder;

FIG. 3 is an enlarged view, partly schematic, showing the stop-shift keys in inactive position; and FIG. 4 is a view similar to FIG. 3 but showing the shift key in a position to actuate the control signal source but short of a position for effecting a stop.

Figure 1:
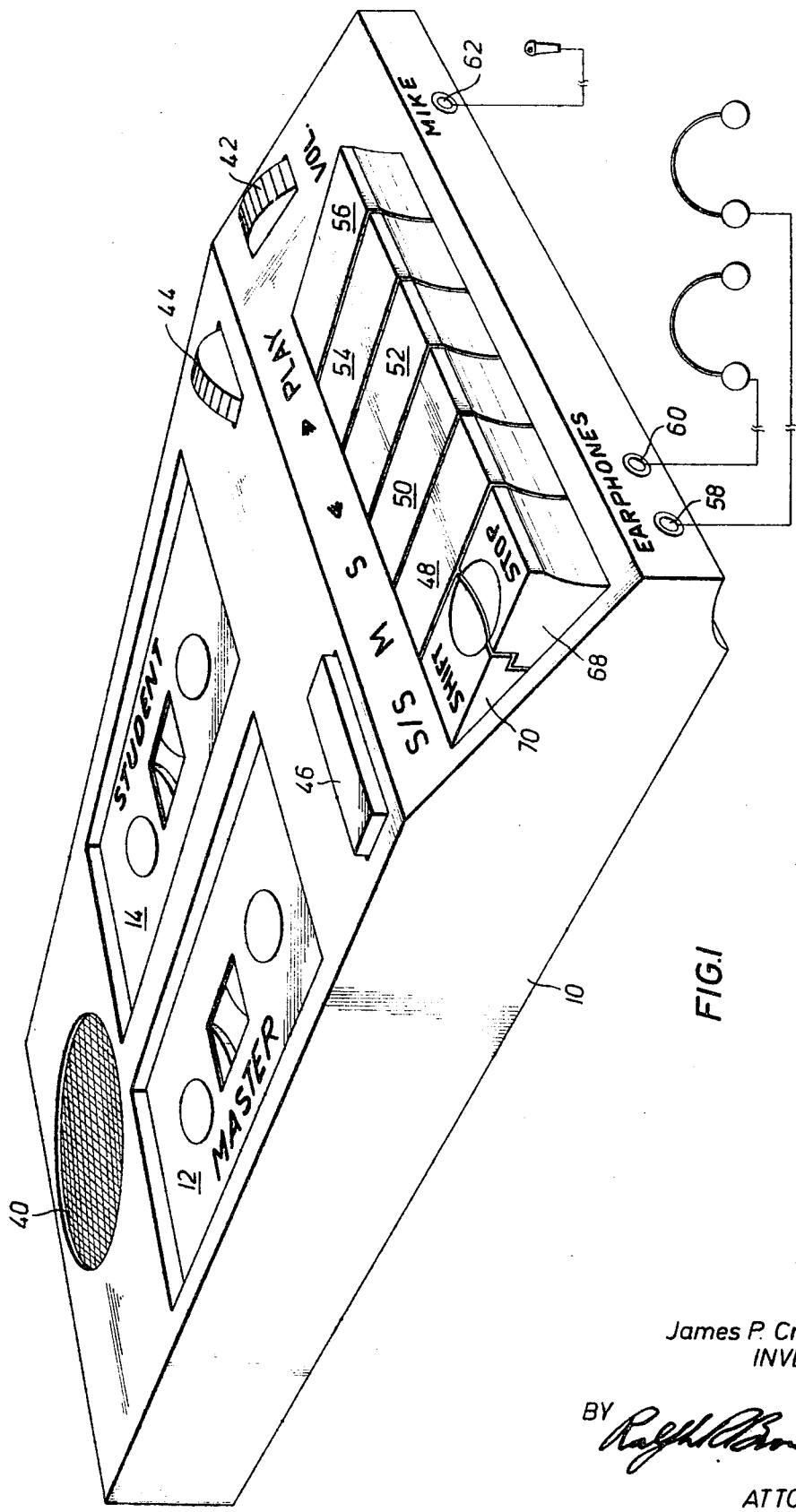
FIG. 1 is a perspective view of the new recorder showing earphones and microphone schematically.

Referring to the drawings, and more particularly to FIG. 1 and FIG. 2, the recorder includes a housing 10 in which is provided a first recording medium well 12 and a second recording medium well 14 designated the "master" and the "student," respectively, in FIG. 1. As shown schematically in FIG. 2, a record-playback system is included in each well. During recording, a first recording medium such as the tape 16 in well 12 is fed from the pay-out reel 18 through the drive rollers 20 and 22 around the record-playback magnetic head 24, and taken up by the the take-up reel 26. Similarly, the magnetic tape 28 in well 14 is fed from the pay-out reel 30 through drive rollers 32 and 34 around record-playback magnetic head 36 and taken up by the take-up reel 38.

Reverting back to FIG. 1, the housing 10 includes the usual speaker 40, volume control 42, and a battery-level-and-recording control 44. A record key 46 is located on the top of the housing 10. Located piano style on the front of the housing are a master key 48, student key 50, forward key 52, reverse key 54, and playback key 56.

Two earphone sockets 58 and 60 are provided in the front of the housing 10. A separate earphone may be plugged into each earphone socket. Also provided in the front of the housing 10 is a microphone socket where the microphone is plugged.

As shown in FIG. 2, the electrical system of the new recorder includes a control signal source 64. The electric signals from control signal source 64 are controlled by the shift portion of the shift-stop key indicated generally by the numeral 66. The shift-stop key means 66 consists of a stop key 68 and a shift key 70.

The electrical system also includes a power source 72 for providing a source of power to the flip-flop 74. Flip-flop 74 is connected through line 76 to the record-playback system in well 14 and through line 78 to the record-playback system in well 12.

Referring to FIG. 3, an upwardly facing shoulder 80 on stop key 68 is positioned below the downwardly facing shoulder 82 on shift key 70. Stop key 68 is independently movable. Therefore, when it is desired to stop the running of tape, the operator merely pushes down the stop key 68. The shift key 70 is not moved by this operation. However, when the shift key 70 is pushed downwardly, an electric switch is closed by the initial downward movement of the shift key 70 to cause a signal from the control signal source to be recorded while the tape is still running; thereafter, the shoulder 82 contacts shoulder 80 on stop 68; and the stop key then moves in unison with the shift key to stop the tape.

The switch is shown schematically in FIG. 3 and FIG. 4 as a movable contact 84 on insulator 86. In FIG. 3, the contact 84 has not been moved downwardly by operation of the shift key 70 and the circuit to control-signal source 64 is open. However, in FIG. 4, the contact 84 has been moved downwardly with the downward movement of the shift key 70 and the circuit to the control-signal source is closed. Note that in FIG. 4, the shoulder 82 has not yet contacted shoulder 80.

To illustrate some of the many uses of this invention, assume a teacher conducting a correspondence course has one of these recorders. The teacher is preparing to send taped questions to a student who also has one of these recorders. The teacher places a tape in the well 12 and, if desired, one also in well 14. He pushes the master key 48, (and also the student key 50 if he has a tape in well 14) and the record key 46. He then dictates the first question which is recorded (simultaneously on both tapes, if he has two in place, otherwise on only one.).

At the end of the first question, the teacher pushes the shift key 70. By this operation, the circuit including the control signal source is closed by switch 84, a control signal is recorded on the one or both tapes, as the case may be, indicating the end of the first question, shoulder 82 contacts shoulder 80 on stop key 68, and both tapes are stopped. The switch 84 is not activated when the key returns to its normal position so as not to record double control signals on the tape. Preferably the indicating signal has a frequency different from the expected sonic frequencies recorded on the tapes. It may be supersonic if desired, or it may be other than electronic.

After recording the first question, the teacher records his second question, pushes the shift key downwardly, to obtain an indicating signal on the tape or tapes, and stops the tape or tapes again. This procedure is repeated until all of the questions are recorded on the tape or tapes.

The teacher sends one tape to the student and, if he has made two, keeps the other tape for himself. When the student receives the tape from the teacher, he places the tape having recorded questions in the well 12 of his recorder and puts a new tape in well 14. The student pushes the master key 48 and the playback key 56 and listens on phones 88 or 90 or speaker 40 to the first question. At the end of the first question, when the recorded signal is sensed it is transmitted by connections 92 and 94 to flip-flop 74, which automatically switches the power supply from 72 to shut off the power to the master 12 into lead 76 to the student recorder 14. This function, although preferably automatically performed, could be performed manually by the operator if the signal were of a type he could sense. In such case, the operator, upon sensing the recorder signal as it is played back, would push the stop key 68 to stop the tape in well 12. In either case, the drive to the well 12 would be shut off and nothing further would occur until the student pushes sequentially the record key 46 and the student key 50 and records his answer to question 1. At the end of his answer, he pushes shift key 70. This causes the indicator signal from control signal source 64 to be recorded on the tape in well 14 indicating the end of the student's answer to question 1 and stopping the movement of tape in well 14. The student repeats this process until he has answered all of the questions.

The student then sends the taped answers and the questions, unless the teacher kept a copy, back to the teacher. Upon receipt of the taped answers (and questions), the teacher places the tape containing the questions in the well 12 and the tape containing the answers in the well 14 of his record-playback. He then pushes the playback key 56. The tape in the well 12 starts running to playback question 1. This tape runs until the previously recorded control or indicating signal is detected by the magnetic head 24. The flip-flop 74 is responsive to the frequency of the recorded control signal. Therefore, when the control signal recorded on the master tape is detected by magnetic head 24 a signal is fed through line 78 to the flip-flop 74 and the flip-flop is changed from its first bi-stable state to its second bi-stable state. This results in the stopping of the running of the tape in well 12 and the sending of a signal through line 76 to the system in well 14 to start the tape in well 14. The teacher then listens to the answer of question 1. At the end of the answer to question 1, the magnetic head 36 will detect the previously recorded control or indicating signal on the tape in well 14. Upon such detection, the flip-flop 74 again assumes its first bi-stable state causing the tape in well 14 to be stopped and the start of the tape in well 12 to play the second question. The procedure is continuously and automatically repeated interspersing the answers appropriately between questions, enabling the teacher to alternately listen to the questions and the answers.

The master tape can be played back by itself by pushing the master key and the playback key. The student tape can be played back by itself by pushing the student key and the playback key. Both tapes can be advanced simultaneously by pushing the forward key. Both tapes can be reversed simultaneously by pushing the reverse key.

Inasmuch as the electrical, mechanical recording, and control technologies are well known which are capable of carrying out the various operations specified and the present invention does not reside in those technologies but in the combinations of components in such manner as to provide the desired sequence of operations and control specified, no description of the detailed technology involved has been included. The disclosure presented will be sufficient to enable those skilled in the art to practice the invention.

What is claimed is:

1. A recorder-playback combination comprising a first record-playback system, a second record-playback system, a first key operable to permit the recording of sonic signals on the first record-playback system, and a second key operable to permit the recording of sonic signals on the second record-playback system so that sonic signals may be placed on a recording medium in the first record-playback system, the second record-playback system, or both, indicator means for making indications on the recording media to separate the sonic signals, a shift-stop key means adapted to sequentially operate the indicator means and stop all running recording media, a playback key operable to permit the alternate running of the recording media, and detecting means for detecting the indications on the running recording medium and start running the other recording medium.

2. A recorder-playback combination in accordance with claim 1 wherein the indicator means is an electric circuit including a signal source having a frequency different from the frequencies of the sonic signals and an electric switch operated by the operation of the shift key, and the detecting means is a flip-flop circuit interconnecting the record-playback systems.

3. A recorder-playback combination in accordance with claim 2 wherein the shift-stop key means comprises an independently movable stop key, and a shift key having a portion thereof adapted to engage the stop key when the shift key is operated.

4. A recorder-playback combination in accordance with claim 3 wherein the stop key is provided with a shoulder and the shift key is provided with a shoulder normally spaced from the stop key shoulder and adapted to engage the stop key shoulder when the shift key is operated.

5. A recorder-playback combination comprising a housing having a first well and a second well, a tape pay-out reel, a record-playback head, and a tape take-up reel in each of the wells, a motor for driving the tape in each well, a master key operable to permit the recording of sonic signals on tape in the first well, a student key operable to permit the recording of sonic signals on tape in the second well, a stop key having an upwardly facing shoulder and operable to stop the movement of tape in the wells, an electric circuit including an ultrasonic signal source and switch means, a shift key having a downwardly facing shoulder normally spaced above the upwardly facing shoulder of the stop key, the shift key being adapted upon being pushed downwardly to first, close the switch means to record an ultrasonic signal on tape then moving in the wells, then contact the downwardly facing shoulder with the upwardly facing shoulder of the stop key and then move the stop key downwardly to stop the tape, a playback key for playing back the sonic and ultrasonic signals on the tapes in the wells, and a flip-flop switch circuit interconnecting the tape-drive motors and responsive to the detection of an ultrasonic signal from the running tape to automatically stop the running tape and start the other tape.

6. A method of interspersing two series of signals separately recorded on different media comprising:
  a. recording a first series of signals on a first recording medium while placing indications on said first recording medium to separate the individual signals of said first series;
  b. initiating playback of said first series of signals;
  c. arresting playback of said first series of signals upon detection of one of one of said indications;
  d. while playback of said first series is arrested, recording one of a second series of signals on a second recording medium and placing an indication on said second recording medium at the termination of said one of the second series;
  e. stopping the running of said second recording medium;
  f. resuming playback of said first series;
  g. repeating steps c, d, e and f until all of said second series have been recorded on said second recording medium and are separated by indications;
  h. re-initiating playback of the first series;
  i. arresting playback of said first series and initiating playback of said second series upon detection of one of said indications on said first recording medium;
  j. arresting playback of said second series and resuming playback of said first series upon detection of one of said indications on said second recording medium;
  k. continuing to arrest playback of one recording medium and resume playback of the other upon detection of each of said indications until the two series of sonic signals have been played in interspersed fashion.

* * * * *